US012125104B2

(12) United States Patent
Schmitz et al.

(10) Patent No.: US 12,125,104 B2
(45) Date of Patent: Oct. 22, 2024

(54) SELF-GOVERNED DATA EXCHANGE SYSTEM THAT PRICES DATA ELEMENTS AGGREGATED FOR EXCHANGE

(71) Applicant: Lattice Industries, Inc., Greenville, DE (US)

(72) Inventors: Jennifer Mary Schmitz, Orinda, CA (US); Katherine Farrell Thome, Austin, TX (US)

(73) Assignee: LATTICE INDUSTRIES, INC., Greenville, DE (US)

( * ) Notice: Subject to any disclaimer, the term of this patent is extended or adjusted under 35 U.S.C. 154(b) by 0 days.

(21) Appl. No.: 18/467,081

(22) Filed: Sep. 14, 2023

(65) Prior Publication Data

US 2024/0005403 A1    Jan. 4, 2024

Related U.S. Application Data

(63) Continuation of application No. 17/591,249, filed on Feb. 2, 2022, now Pat. No. 11,816,731, which is a continuation of application No. 16/684,834, filed on Nov. 15, 2019, now Pat. No. 11,276,118.

(60) Provisional application No. 62/767,651, filed on Nov. 15, 2018.

(51) Int. Cl.
*G06Q 40/04*    (2012.01)
*G06F 16/25*    (2019.01)
*G06Q 30/0201*    (2023.01)

(52) U.S. Cl.
CPC .......... *G06Q 40/04* (2013.01); *G06F 16/25* (2019.01); *G06Q 30/0201* (2013.01)

(58) Field of Classification Search
CPC ..... G06Q 40/04; G06Q 30/0201; G06F 16/25
See application file for complete search history.

(56) References Cited

U.S. PATENT DOCUMENTS

| 11,276,118 | B1 | 3/2022 | Schmitz et al. |
| 11,562,023 | B1 | 1/2023 | Batsakis et al. |
| 2014/0032267 | A1 | 1/2014 | Smith et al. |
| 2019/0228109 | A1 | 7/2019 | Williams et al. |
| 2019/0236627 | A1 | 8/2019 | Christensen |
| 2019/0236637 | A1 | 8/2019 | Kumar et al. |

OTHER PUBLICATIONS

U.S. Appl. No. 16/684,834, Non-Final Office Action, Mailed On May 13, 2021, 3 pages.
U.S. Appl. No. 16/684,834, Notice of Allowance, Mailed On Nov. 2, 2021, 9 pages.
U.S. Appl. No. 17/591,249, Notice of Allowance, Mailed On Jun. 16, 2023, 9 pages.

*Primary Examiner* — Scott S Trotter
(74) *Attorney, Agent, or Firm* — Kilpatrick Townsend & Stockton LLP

(57) ABSTRACT

A self-governed data exchange system is disclosed to price data elements and aggregate data on a self-governed data exchange. Combining data from a variety of IoT domains will lower storage and administration costs for data generators as well as standardize the ability to query and monetize the data. Also, data will be more readily available to third parties allowing for higher overall revenue back to the data providers.

20 Claims, 7 Drawing Sheets

SELF-GOVERNED DATA EXCHANGE SYSTEM THAT PRICES DATA ELEMENTS AGGREGATED FOR EXCHANGE

CLAIM OF BENEFIT TO PRIOR APPLICATION

This application is a continuation of U.S. patent application Ser. No. 17/591,249, filed Feb. 2, 2022, which is a continuation of U.S. application Ser. No. 16/684,834, filed Nov. 15, 2019, which claims priority to and claims benefit of U.S. Provisional Patent Application No. 62/767,651, filed Nov. 15, 2018, which are herein incorporated by reference in their entirety.

BACKGROUND

Embodiments of the invention described in this specification relate generally to data exchange systems, and more particularly, to a self-governed data exchange system that prices data elements aggregated for exchange.

At present no mechanism exists to accumulate, aggregate, and analyze data from multiple Internet of Things (IoT) sensors that can be used across domains. For example, a water level sensor provides data to a water utility and a traffic camera provides traffic data to police departments and traffic monitoring apps. At present, such IoT sensor data are not aggregated and cannot be easily utilized to identify commonalities (i.e., if there a storm about to cause flooding, the water sensor data would be useful in predicting traffic flows).

Also, there is no pricing model for entities to share this data. Existing pricing mechanisms do not address the need for additional data elements and do not fully capture the market value of data.

Therefore, what is needed is a way to combine data from a variety of IoT domains to lower storage and administration costs for data generators as well as standardize the ability to query and monetize the data, and to provide a way for data to be more readily available to third parties allowing for higher overall revenue back to the data providers.

BRIEF DESCRIPTION

Some embodiments of the invention include a novel self-governed data exchange system that prices data elements aggregated for exchange. In some embodiments, the self-governed data exchange system includes a data warehouse, a data exchange computer network that acts as a central hub and receives data from exchange members and stores the received data in the data warehouse, an API integrator that allows members to supply data to and query data from the data warehouse of the data exchange computer network and that passes data to non-member third parties, a pricing portal and volume calculator that connects to the data exchange computer network and performs calculations in order to determine volume and prices based on several parameters, and a pricing parameter table that holds the calculation variables for the pricing portal and volume calculator.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
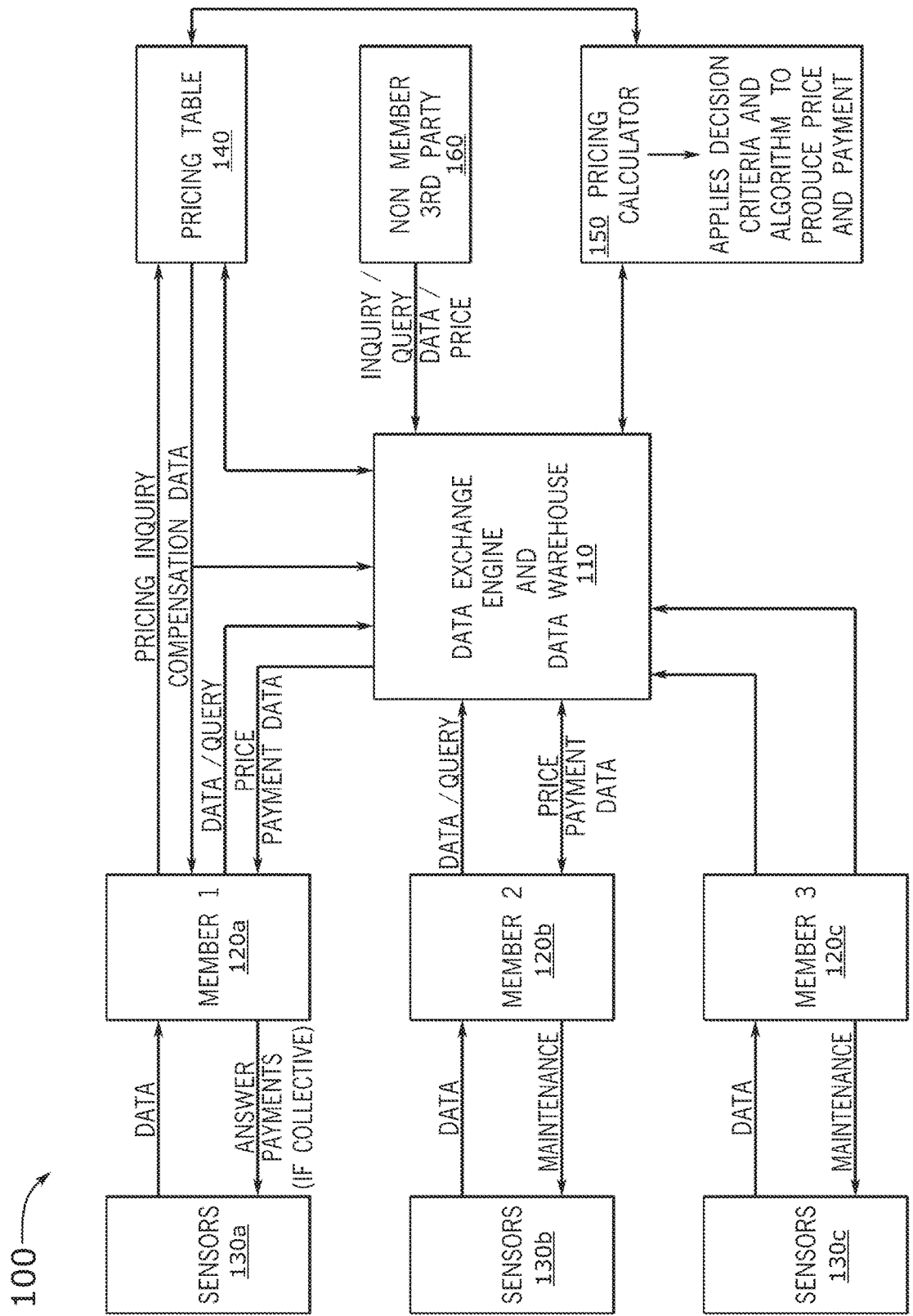

Having thus described the invention in general terms, reference is now made to the accompanying drawings, which are not necessarily drawn to scale, and which show different views of different example embodiments, and wherein:

FIG. 1 conceptually illustrates a self-governed data exchange system of some embodiments that prices data elements aggregated for exchange.

Figure 2:
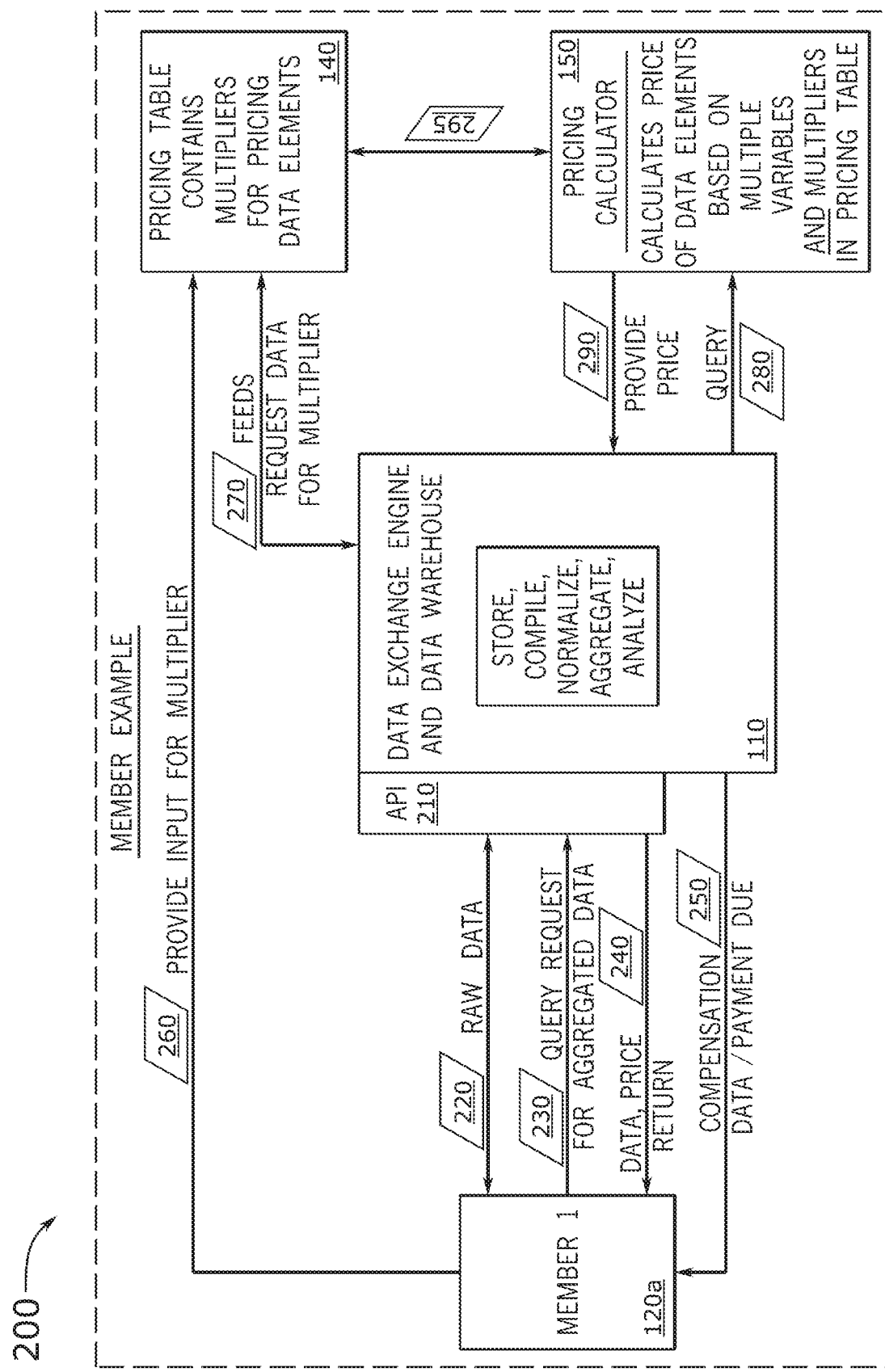

FIG. 2 conceptually illustrates a detailed member view of a self-governed data exchange system of some embodiments that prices data elements aggregated for exchange.

Figure 3:
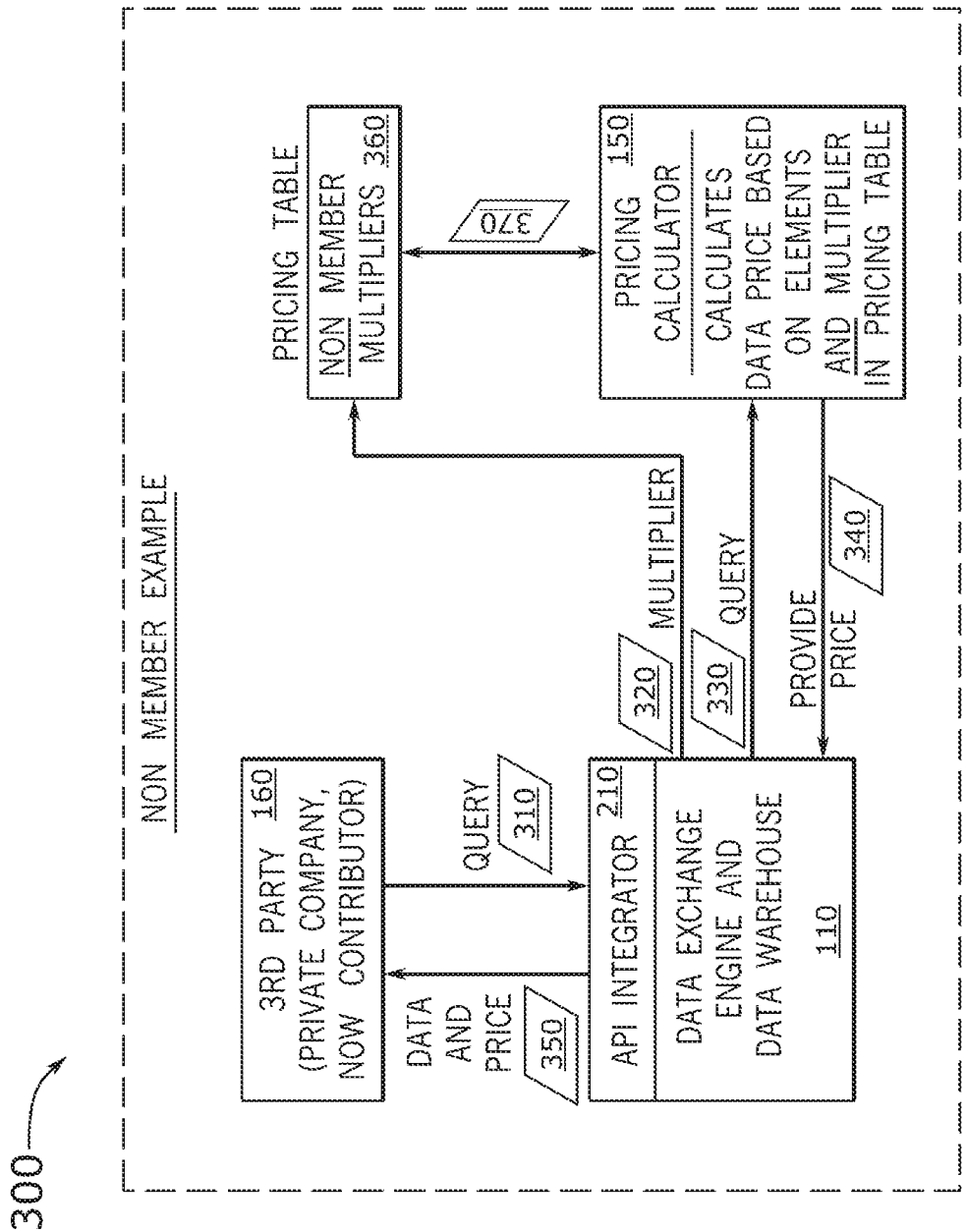

FIG. 3 conceptually illustrates a detailed non-member view of a self-governed data exchange system of some embodiments that prices data elements aggregated for exchange.

Figure 4:
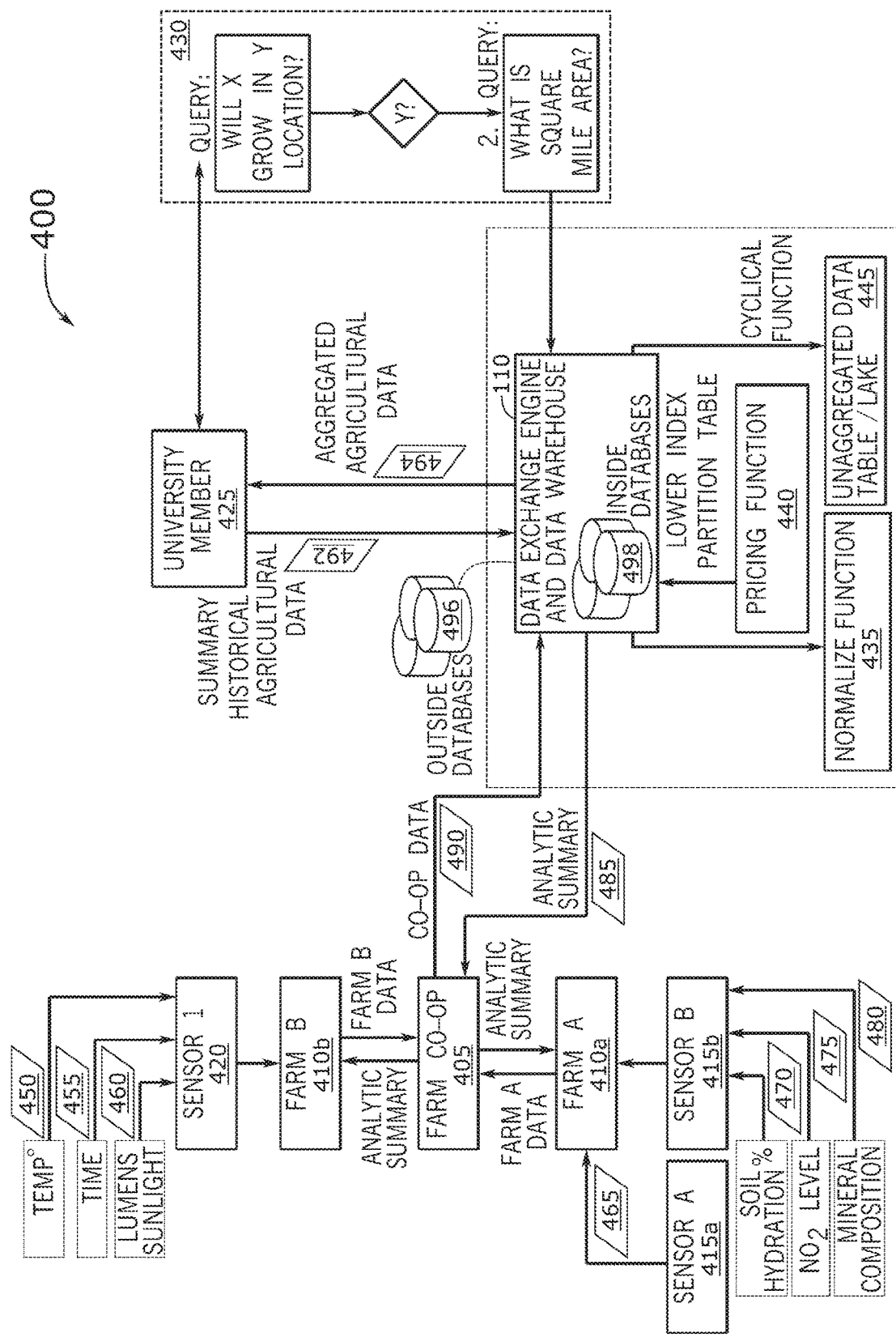

FIG. 4 conceptually illustrates a detailed co-op view of a self-governed data exchange system of some embodiments that prices data elements aggregated for exchange.

Figure 5:
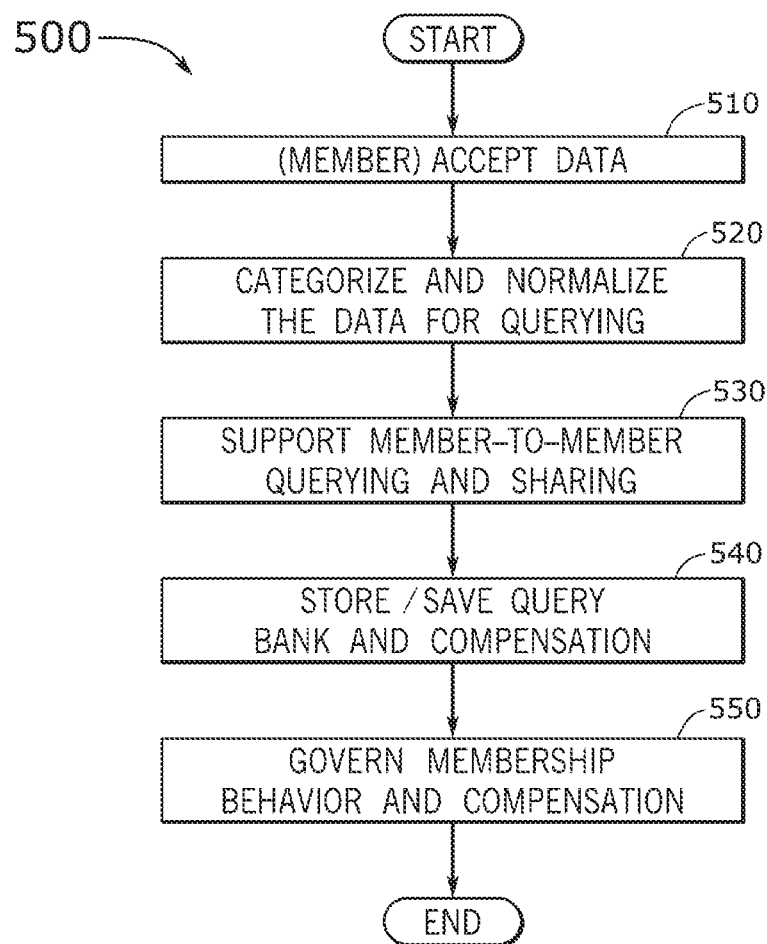

FIG. 5 conceptually illustrates a member process for interacting with a self-governed data exchange system that prices data elements aggregated for exchange in some embodiments.

Figure 6:
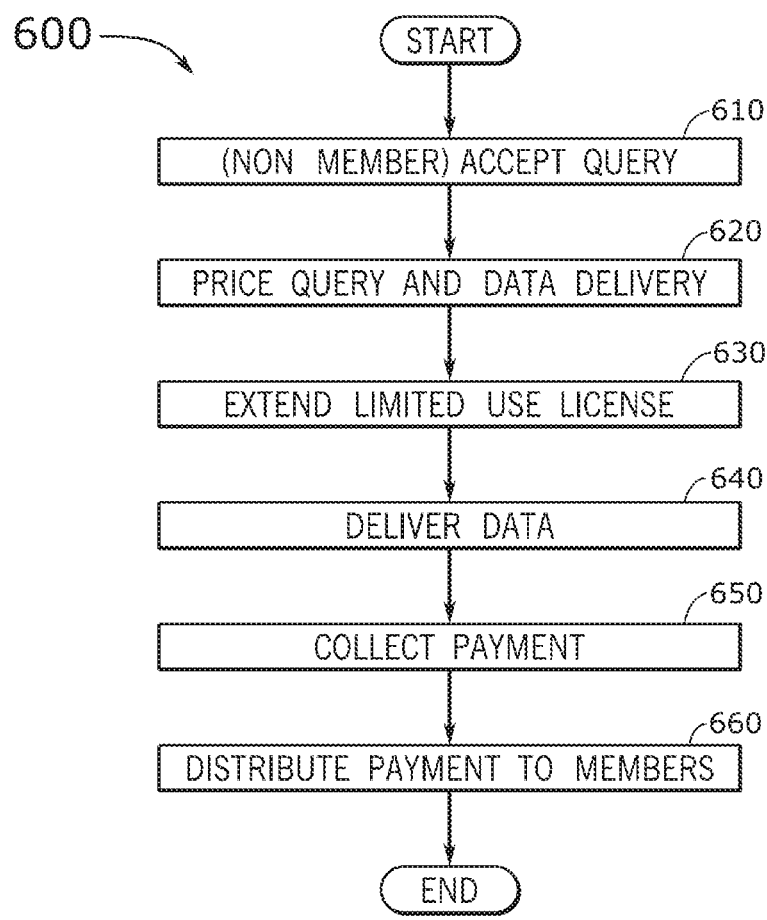

FIG. 6 conceptually illustrates a non-member process for interacting with a self-governed data exchange system that prices data elements aggregated for exchange in some embodiments.

Figure 7:
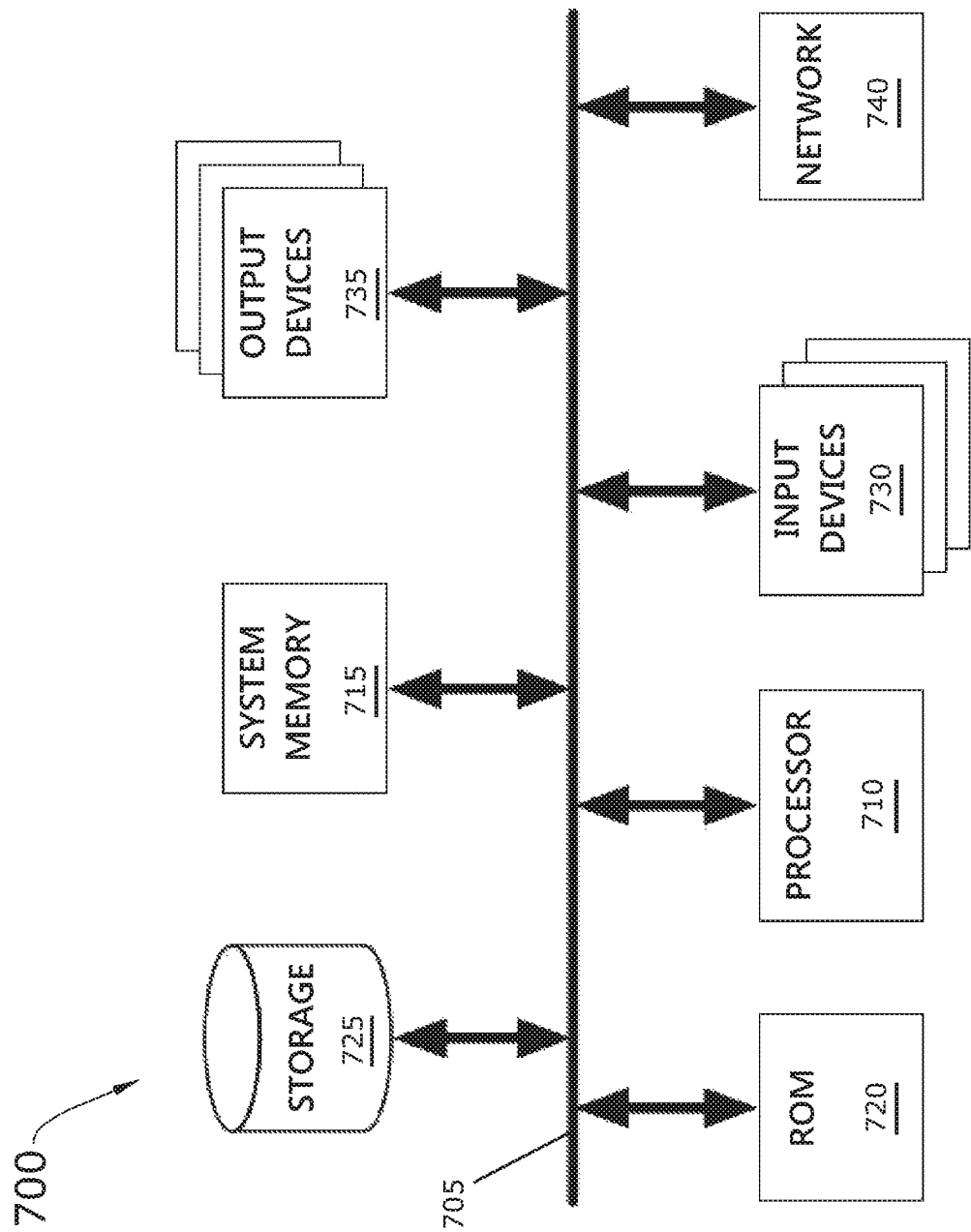

FIG. 7 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel self-governed data exchange system that prices data elements aggregated for exchange. In some embodiments, the self-governed data exchange system includes a data warehouse, a data exchange computer network that acts as a central hub and receives data from exchange members and stores the received data in the data warehouse, an API integrator that allows members to supply data to and query data from the data warehouse of the data exchange computer network and that passes data to non-member third parties, a pricing portal and volume calculator ("pricing calculator") that connects to the data exchange computer network and performs calculations in order to determine volume and prices based on several parameters, and a pricing parameter table that holds the calculation variables for the pricing portal and volume calculator.

As stated above, no mechanism presently exists to accumulate, aggregate, and analyze data from multiple IoT sensors that can be used across domains (e.g., water level sensor that provides data to a water utility, traffic camera that provides traffic data to police departments, etc.). At present, such IoT sensor data are not aggregated and cannot be easily utilized to identify commonalities. Also, there is no pricing model for entities to share this data. Existing pricing mechanisms do not address the need for additional data elements and do not fully capture the market value of data. Embodiments of the self-governed data exchange system that prices data elements aggregated for exchange described in this specification solve such problems by using both network fees as well as value and usage-based pricing for data elements stored in a data warehouse through the formation of a data exchange. In some embodiments, members within such an exchange can barter data while non-member third party entities are charged with the proceeds being directed back into the exchange to reinvest in innovation and infrastructure.

Embodiments of the self-governed data exchange system that prices data elements aggregated for exchange described in this specification differ from and improve upon currently existing options. In particular, some embodiments of the self-governed data exchange system differ from existing pricing mechanisms in which pricing in this field is based on single data domains and is negotiated in individual contracts with long and cumbersome negotiation processes. In contrast, the self-governed data exchange system includes an exchange pricing model platform that supports standardization of pricing data elements aggregated for exchange, and which also provides enhanced member benefits, including, without limitation, the ability for members of the exchange (members including individuals, business entities and organizations, co-operatives, jurisdictions, etc.) to receive compensation for their initial infrastructure investments in IoT sensors and other exchange related technologies.

In addition, some embodiments of the self-governed data exchange system that prices data elements aggregated for exchange improve upon the currently existing conventional data pricing schemes that are typically cumbersome for participants to work with and generally lack scalability and flexibility in pricing, as would typically be needed for these types of contracts which require individual negotiation between parties. Furthermore, the presently existing IoT sensor systems include significant security risks at the individual sensor level. However, the self-governed data exchange system that prices data elements aggregated for exchange spreads risk. In effect, an exchange responsible for managing pricing and security distributes risk among participants and reduces cost. Also, the self-governed data exchange system that prices data elements aggregated for exchange combines data from a variety of IoT domains and other member-approved data combinations authorized for exchange. Combining data from a variety of several IoT domains and other member-approved domains has many positive outcomes, including, without limitation, (i) lowering storage and administration costs for data generators, (ii) standardizing the ability to query and monetize the data, and (iii) ensuring that data is readily available to third parties allowing for higher overall revenue back to the data providers.

The self-governed data exchange system that prices data elements aggregated for exchange of the present disclosure may be comprised of the following elements. This list of possible constituent elements is intended to be exemplary only and it is not intended that this list be used to limit the self-governed data exchange system of the present application to just these elements. Persons having ordinary skill in the art relevant to the present disclosure may understand there to be equivalent elements that may be substituted within the present disclosure without changing the essential function or operation of the self-governed data exchange system.

1. Data Exchange Computer Network (also referred to as the "data exchange engine and data warehouse")
2. Pricing Portal and Volume Calculator (also referred to simply as the "pricing calculator")
3. API integrator
4. Pricing Parameter Table (also referred to simply as the "pricing table")

The various elements of the self-governed data exchange system that prices data elements aggregated for exchange of the present disclosure may be related in the following exemplary fashion. It is not intended to limit the scope or nature of the relationships between the various elements and the following examples are presented as illustrative examples only. The data exchange computer network (item 1) receives data from members and stores the received data in a data warehouse. In this way, the data exchange computer network (item 1) acts as a central hub of the self-governed data exchange system. Further details of the data exchange computer network as a central hub of the self-governed data exchange system are described below, by reference to FIG. 1. The API integrator (item 3) allows members to supply data to and query data from the data warehouse of the data exchange computer network (item 1). Further details of the API integrator from the perspective of a member are described below, by reference to FIG. 2. The API integrator (item 3) also can pass data to third parties. The API integrator is further described from the perspective of a non-member by reference to FIG. 3. The pricing portal and volume calculator (item 2) connects to the data exchange computer network (item 1) and performs calculations in order to determine volume and prices based on several parameters in connection with the data warehouse. The pricing parameter table (item 4) holds the calculation variables for the pricing portal and volume calculator (item 2). Details of the pricing calculator and the pricing table are provided below, by reference to FIGS. 1-4.

The self-governed data exchange system that prices data elements aggregated for exchange of the present disclosure generally works by first building the data warehouse and programming it to store data from multiple members in the data exchange. By way of example, FIG. 1 conceptually illustrates a self-governed data exchange system 100 that prices data elements aggregated for exchange. As shown in this figure, the self-governed data exchange system 100 includes a data exchange engine and data warehouse 110, a plurality of exchange members 120a-120c, a plurality of sensors 130a-130c, a pricing table 140, a pricing calculator 150, and a non-member third party 160.

In some embodiments, the data exchange engine and data warehouse 110 is deployed as a central hub of a data exchange computer network of the self-governed data exchange system 100 to provide data exchange processing, communication, data element pricing, and data warehousing for member-driven, and non-member, data input and data requests. Exchange members and non-member entities connect to and interact with the data exchange engine and data warehouse 110 by way of an API integrator (not show in this figure). Further details and examples member/non-member usage of the API integrator are described below, by reference to FIGS. 2 and 3.

In some embodiments, the self-governed data exchange system 100 supports any number of simultaneous exchange member and non-member connections. The plurality of exchange members 120a-120c shown in this figure include a first exchange member 120a ("MEMBER 1"), a second exchange member 120b ("MEMBER 2"), and a third exchange member 120c ("MEMBER 3"). The plurality of exchange members 120a-120c demonstrate that the self-governed data exchange system 100 is a scalable system that is deployed within and operates over a data exchange computer network. An example of a cloud architecture of the data exchange computer network for the self-governed data exchange system 100 is described below, by reference to FIG. 7. Thus, the self-governed data exchange system 100 is capable of supporting several simultaneous member connections and can scale to support any number of simultaneous connections with little or no noticeable latency in data transmissions, data processing, and data storage and retrieval from databases and other data sources. In this way, the self-governed data exchange system 100 supports high and low volume data concurrency demands from multiple exchange members and other non-member parties connecting to the self-governed data exchange system 100 for data requests, transmissions, and other non-member related processing and data needs at the data exchange engine and data warehouse 110 and over the data exchange computer network. Accordingly, a person of ordinary skill in the relevant art would appreciate that the three exchange members shown in this figure is merely exemplary, and is not intended as a constraint or limitation of the self-governed data exchange system 100.

The plurality of sensors 130a-130c shown in this figure are IoT sensors that correspond to the plurality of exchange members 120a-120c. Each exchange member may deploy one or more IoT sensors. Thus, the first exchange member 120a is associated with one or more sensors 130a, the second exchange member 120b is associated with one or more sensors 130b which may overlap in part or entirely with the one or more sensors 130a corresponding to the first exchange member 120a. Similarly, the third exchange member 120c is associated with one or more sensors 130c which may overlap in part or entirely with the one or more sensors 130a corresponding to the first exchange member 120a or the one or more sensors 130b corresponding to the second exchange member 120b. Examples of IoT sensors include, without limitation, water level sensors that provide data to a water utility, a traffic camera that provides traffic data to police departments and traffic monitoring apps, a thermometer that provides a temperature reading to a weather station, a clock that provides time information, a light sensor that measures lumens of sunlight for a farmer in need of sunlight for crop growth, a soil sensors for a farmer growing particular crops, such as a soil hydration sensor, a nitrogen concentration sensor, and/or a mineral composition sensor, etc.

In some embodiments, the pricing table 140 (also referred to as the "pricing parameter table") includes calculation variable entries for the pricing calculator 150 (also referred to as the "pricing portal and volume calculator").

In some embodiments, the pricing calculator 150 connects to the data exchange engine and data warehouse 110 over the data exchange computer network and performs calculations in order to determine volume and prices based on several parameters provided, at least in part, by calculation entries that are read from the pricing table 140, but which is also based on applying decision criteria to produce prices and payment information.

In some embodiments, the non-member third party 160 is an entity, such as a person, a corporation, an educational institution, etc., which is not an active, registered member of the exchange, but which needs to obtain aggregated data in a particular domain (or across multiple domains) for a price determined by the exchange at non-member pricing levels.

In some embodiments, the self-governed data exchange system 100 works by providing and requesting (querying for) data in general or in one or more particular domains, obtaining pricing information for the data, and providing payments to members for data used by others through the exchange. For example, the data exchange engine and data warehouse 110 receives data from each of the plurality of exchange members 120a-120c and stores the received data in a data warehouse, such as an inside database communicably connected to the data exchange engine and data warehouse 110. Specifically, the first exchange member 120a may provide data from a first data domain as captured by its sensors 130a (which may be capable of capturing data in relation to the first data domain), the second exchange member 120b may provide data from a second data domain as captured by its sensors 130b (which may be suitable for capturing data in relation to the second data domain), and the third exchange member 120c may provide data from a third data domain as captured by its sensors 130c (which may be suited for capturing data in relation to the third data domain). Furthermore, each of the data domains may be different from each other, due at least in part to the nature of the different IoT sensors being deployed by each of the exchange members 120a-120c to capture their data. In some cases, an exchange member who provides data may also request data from the data exchange engine and data warehouse 110 by submitting a query for the particular data needed. This is shown by the first exchange member 120a and the second exchange member 120b who, along with providing their data, request data from the data exchange engine and data warehouse 110 by submitting a query for particular data which the exchange member needs. When the data exchange engine and data warehouse 110 receives their queries, the pricing table 140 is viewed to determine if a multiplier or pricing parameter is to be applied when calculating the price for said requested data. For example, as an exchange member, the first exchange member 120a may benefit from a discounted price of the data, while the non-member third party 160 would need to pay a premium for the same data even based on the same query. To check, the first exchange member 120a can perform a pricing inquiry against the pricing table 140 to determine an approximate price for requested data. Also, when other members or non-members want to receive data which the first exchange member 120a has provided to the data exchange engine and data warehouse 110, the first exchange member 120 can receive compensation data from the pricing table 140 to know how valuable the data is. The pricing information, as well as actual pricing data when a query for data is received from a member or non-member, is calculated by the pricing calculator 150, which applies decision criteria and looks up entries in the pricing table (which may include values, multipliers, discounts, or other pricing parameters that impact the calculation of the data price), producing price and payment information which is sent back to the data exchange engine and data warehouse 110 for transmission back to the inquiring member or non-member and for distribution of payment to the data-providing member. Thus, when actual data from the first exchange member 120a (or any other data contributing exchange member) is provided to another member or non-member in response to a query for said data, then the exchange member who originally provided the data is compensated according to the price calculated by the pricing calculator 150 in connection with data looked-up in the pricing table 140, as shown by payment data which the data exchange engine and data warehouse 110 provides back to the particular exchange member. In this way, the data exchange engine and data warehouse 110 acts as a central hub across the data exchange computer network of the self-governed data exchange system 100.

While the API integrator is not described by reference to FIG. 1, the API integrator is an instrumental component of the self-governed data exchange system. In some embodiments, exchange members use the API integrator to provide their data to the data exchange engine and data warehouse in a standardized format. The pricing calculator and the pricing table, in connection with the API integrator, determine how much data comes from each exchange member and allocates costs across the exchange. As exchange members and non-member third party entities begin to query for data from the exchange, these queries are ingested at the API integrator which ensures that they work through the pricing table and pricing calculator to continuously update the value of any given data element and calculate the cost associated with a non-member third party entity using the data element or the balance of credits among exchange members. Data flows through the data exchange computer network in multiple directions. The API integrator allows access to the data exchange engine and data warehouse and pricing components to be extended to and integrated into software and apps for both exchange members and non-member third parties in the exchange. Some examples of exchange member and non-member third party entity usage of the exchange and demonstrations of the functionality of the API integrator are described further below, by reference to FIGS. 2 and 3.

In at least one embodiment, when a data request is received from an exchange member, a particular set of rules that are built into the API integrator are processed for the member and may or may not include a monetary amount. The monetary amount may be a member "price" for data elements so requested. However, the true cost of any such data elements fluctuates in the exchange. Thus, a member "price" may be a cost that is less than a third party request for the same data elements. It follows that when the data request is received from a third party, then the API integrator may employ a different set of criteria to calculate pricing.

To make the self-governed data exchange system that prices data elements aggregated for exchange of the present disclosure, an individual may deploy one or more computer servers with custom modules and protocols to store information in the data warehouse. These computer servers would then use internet protocol (IP) and the API integrator (which includes a set of business rules for accessing the data warehouse via computer) to pass data into the data warehouse and then drive the pricing table and pricing calculator to produce value based outputs which also pass back to members and third parties from the data warehouse, through the API integrator to the originating party. To build the pricing table, a calculation involving data query counts, CPU usage, and a quantity (number) of API calls is set up in the pricing calculator. Variables for the calculation are accessed and controlled separately in the pricing table.

In some embodiments, the pricing table allows the pricing calculator engine to operate in an enhanced manner, specifically, with greater flexibility and efficiency. However, in some other embodiments, the pricing calculator engine operates independently of a pricing table (which therefore, may not even be needed). Nevertheless, as the method repeats over time, the calculations become more accurate and dynamic.

To use the self-governed data exchange system that prices data elements aggregated for exchange of the present disclosure, a person may become a member of the data exchange or build the set of components and acquire their own members to fill the data warehouse and pass the data among various members.

By way of example, FIG. 2 conceptually illustrates a detailed member view of a self-governed data exchange system 200 that prices data elements aggregated for exchange. As shown in this figure, the detailed member view of the self-governed data exchange system 200 includes the data exchange engine and data warehouse 110, the first exchange member 120a, the pricing table 140, the pricing calculator 150, and an API integrator 210.

In some embodiments, the data exchange engine and data warehouse 110 performs data operations in connection with the API integrator 210 and in response to interaction by exchange members or non-members with the API integrator 210. In some embodiments, the data exchange engine and data warehouse 110 is capable of performing a plurality of data operations comprising storing raw data received from exchange members and non-member entities, compiling data in useful formats and domain categories, normalizing raw data in view of a standard normal baseline, aggregating data across multiple raw data feeds, and analyzing the data according to one or more analytical algorithms associated with one or more data domains.

In some embodiments, the API integrator 210 allows the first exchange member 120a to provide raw data 220 to the data exchange engine and data warehouse 110. The raw data 220 provided by the first exchange member 120a is typically sensor-based raw data 220. Raw data 220 is also returned to the first exchange member 120a for maintaining one or more IoT sensors. Similarly, the API integrator 210 allows the first exchange member 120a to make a query request 230 for aggregated data. In response to the query request 230, the API integrator 210 returns data and price 240 back to the first exchange member 120a when the requested aggregated data is available in the data exchange engine and data warehouse 110.

In some embodiments, data provided by an exchange member is compensated when requested and delivered to another member or non-member entity requesting the data. As demonstrated in this figure, the data exchange engine and data warehouse 110 returns compensation data/payment due data 250 to the first exchange member 120a. The compensation data depends on whether the data is requested and delivered to an exchange member or a non-member of the exchange. In particular, the first exchange member 120a provides input for a multiplier 260 that is entered into the pricing table 140 and allows for accurate pricing of data elements available via the exchange. For example, the first exchange member 120a may provide raw data 220 that is captured from one or more IoT sensors deployed by the first exchange member 120a, and the first exchange member 120a may provide a multiplier value to apply for pricing the data when requested by a non-member entity.

This is shown by the data exchange engine and data warehouse 110 feeding request data 270 for a multiplier into the pricing table 140 and sending a price query 280 to the pricing calculator 150, which may originate from a query of another member or a non-member entity. In response, the multiplier data 295 is passed between the pricing table 140, which stores entries with the multiplier values for various data elements, and the pricing calculator 150, which calculates the price of data elements based on the multiplier data 295 retrieved from the pricing table 140, as well as one or more other variables that impact pricing of data. Then, with the price calculated, the pricing calculator 150 returns the price 290 to the data exchange engine and data warehouse 110, which then forwards the price 290 to the requesting member or non-member (e.g., returning data and price 240 to the first exchange member 120a, returning price 290 to a non-member, etc.).

Now turning to another example, FIG. 3 conceptually illustrates a detailed non-member view of a self-governed data exchange system 300 that prices data elements aggregated for exchange. As shown in this figure, the detailed non-member view of the self-governed data exchange system 300 includes the data exchange engine and data warehouse 110, the API integrator 210, a non-member third party 160, a pricing table with non-member multipliers 360, and the pricing calculator 150. In some embodiments, the pricing table with non-member multipliers 360 is a look-up table that is the same as the pricing table 140. In some other embodiments, the pricing table with non-member multipliers 360 is a separate look-up table with different multipliers from the pricing table 140.

In some embodiments, the API integrator 210 allows the non-member third party 160 to submit a query 310 requesting data from the exchange across one or more data domains. When the query 310 is received, the data exchange engine and data warehouse 110 triggers a look-up of the multiplier 320 in the pricing table with non-member multipliers 360. Concurrently, the data exchange engine and data warehouse 110 sends a query 330 to the pricing calculator 150 to calculate the data price based on the data elements requested by the non-member third party 160 and the multiplier 320 associated with the requested data, with the multiple being transmitted 370 (passed to the pricing calculator 150/retrieved from the pricing table with non-member multipliers 360). Then the pricing calculator 150 calculates the price and returns the price 340 to the data exchange engine and data warehouse 110. Finally, the API integrator 210 returns the requested data and price 350 to the non-member third party 160.

In some embodiments, the self-governed data exchange system is accessible to individual exchange member entities, individual non-member third party entities, and exchange member cooperatives ("co-op member"). In some embodiments, a co-op member includes a plurality of entities who share data retrieved from the self-governed data exchange system and provide aggregated raw data to the self-governed data exchange system for distribution on the exchange. In some embodiments, the self-governed data exchange system supports any number of simultaneous co-op member, exchange member, and non-member connections. The description that follows includes an example of a co-op member.

By way of example, FIG. 4 conceptually illustrates a detailed co-op member view of a self-governed data exchange system 400 that prices data elements aggregated for exchange. As shown in this figure, the co-op member view of the self-governed data exchange system 400 includes the data exchange engine and data warehouse 110, a farm co-op member 405, a first farm 410a ("FARM A"), a second farm 410b ("FARM B"), a first FARM A sensor 415a ("SENSOR A"), a second FARM A sensor 415b ("SENSOR B"), a FARM B sensor 420 ("SENSOR 1"), a university exchange member 425, a set of queries 430, a pricing function 440, a normalize function 435, an unaggregated data table/data lake 445, a set of outside databases 496, and a set of inside databases 498.

In some embodiments, the data exchange engine and data warehouse 110 include the set of inside databases 498. In some embodiments, the set of inside databases 498 comprise at least one database and a database management system that allows the data received from exchange members and non-member third party entities to be persisted and retrieved by query request. In some embodiments, the data is sorted according to one or more data domains which correspond to a separate database in the set of inside databases 498. In some embodiments, the data is sorted according to one or more data domains which correspond to internal data tables within a single, monolithic database that is managed by the database management system.

In some embodiments, the data exchange engine and data warehouse 110 is communicably connected to a set of outside database 496. In some embodiments, the set of outside databases 496 store data that is available by query request to exchange members and non-member third party entities. In some embodiments, the data exchange engine and data warehouse 110 implements one or more database API bindings that are associated with one or more external databases, accessible over a public network, such as the Internet.

In some embodiments, the data exchange engine and data warehouse 110 includes a lower index partition table and a cyclical function. In some embodiments, the data exchange engine and data warehouse 110 employs the pricing function 440 to calculate price/cost of data elements stored in any database from the set of inside databases 498 and the set of outside databases 496. In some embodiments, the pricing function 440 is logically integrated into a pricing portal that includes both the pricing table and the pricing calculator, and which includes the unaggregated data table/data lake 445 to store unsorted data elements and the normalize function 435 to normalize variables in order to provide price/cost consistency across data domains.

The co-op member view of the self-governed data exchange system 400 of some embodiments functions by transmitting data into and out of the exchange, handling requests for data, and capturing of raw sensor-based data. In particular (and as shown in this figure), the FARM B sensor 420 ("SENSOR 1") captures a variety of natural data including, temperature 450, time 455, and lumens of sunlight 460. The FARM B sensor 420 ("SENSOR 1") provides the captured sensor data for temperature 450, time 455, and lumens of sunlight 460 ("FARM B DATA") to the second farm 410b ("FARM B"), which forwards the FARM B DATA to the farm co-op member 405. Similarly, the first FARM A sensor 415a ("SENSOR A") and the second FARM A sensor 415b ("SENSOR B") capture natural data, including soil hydration percentage 470, nitrogen level 475, and mineral composition 480 for the second FARM A sensor 415b ("SENSOR B"), and other data 465 for the first FARM A sensor 415a ("SENSOR A"). All of the captured data ("FARM A DATA") of SENSOR A and SENSOR B are then provided to the first farm 410a ("FARM A"), which forwards the FARM A DATA to the farm co-op member 405.

The farm co-op member 405 aggregates the FARM A DATA received from first farm 410a and the FARM B DATA received from the second farm 410b and transmits the aggregated data 490 ("CO-OP DATA") to the data exchange engine and data warehouse 110, which processes, sorts, normalizes, categorizes, and stores the CO-OP DATA in one or more of the inside databases 498. In this way, a co-op member can provide data into the exchange from multiple participating co-op entities (in this example, FARM A and FARM B).

The co-op member view of the self-governed data exchange system 400 of some embodiments also supports data sharing by multiple co-op entities that form together as a co-op member of the exchange. For example, the first farm 410a may request a particular set of data as understood by a query that it submits to the farm co-op member 405, while the second farm 410b may request a different set of data as understood by a different query that it also submits to the farm co-op member 405. In this example, the farm co-op member 405 can send both queries to the API integrator at the data exchange engine and data warehouse 110, and get pricing information and data returned based on the queries. In some embodiments, an analytic summary 485 is returned from the data exchange engine and data warehouse 110 to the farm co-op member 405. In some embodiments, the analytic summary 485 includes information that pertains to data requested in both queries. The farm co-op member 405 then provides the analytic summary 485 to the first farm 410a and the second farm 410b. In this way, the farm co-op member 405 is able to effectively share the data requested by the first farm 410a with the second farm 410b and, likewise, share the data requested by the second farm 410b with the first farm 410a.

Also shown in this figure, the university exchange member 425 provides summary historical agricultural data 492 to the exchange. The university exchange member 425 may be a co-op member in its own right, if made up of multiple separate departments or colleges which have separate data domain needs, or may be an individual exchange member. In any case, the university exchange member 425 is shown in this example as issuing a set of queries 430. Specifically, one query in the set of queries 430 is understood as asking whether agricultural item "X" will grow in location "Y" and another query in the set of queries 430 is understood as asking what the square mile region surrounding location "Y" in which agricultural item "X" will grow when planted. In this example, the two queries in the set of queries 430 appear to be dependent queries in which the second query would not be relevant unless the first query returns a positive result. However, multiple queries can be submitted which have no dependencies. When the university member 425 submits the set of queries 430, the data exchange engine and data warehouse 110 processes the queries and returns the aggregated agricultural data 494 to the university member 425. The aggregated agricultural data 494 would provide the answers sought by the university member 425 as to the inquiries laid out in the set of queries 430.

Many of the above examples describe aspects of the self-governed data exchange system that prices data elements aggregated for exchange. However, the next two examples, described below by reference to FIGS. 5 and 6, describe processes for interacting with the self-governed data exchange system.

By way of example, FIG. 5 conceptually illustrates a member process 500 for interacting with a self-governed data exchange system that prices data elements aggregated for exchange. As shown in this figure, the member process 500 starts by accepting data (at 510) from an example member. The member process 500 then categorizes and normalizes (at 520) the data for querying. In some embodiments, the member process 500 supports member-to-member querying and sharing of data (at 530). In some embodiments, the member process 500 includes storing/saving queries (at 540) in a query bank and also stores data compensation information. In some embodiments, the member process 500 also governs membership behavior and compensation (at 550). Then the member process 500 ends.

In some embodiments, the member process 500 performs one or more of the steps 510-550 in any order based on need or request. In some embodiments, the member process 500 performs one or more of the steps 510-550 non-sequentially.

Now turning to another example, FIG. 6 conceptually illustrates a non-member process 600 for interacting with a self-governed data exchange system that prices data elements aggregated for exchange. As shown in this figure, the non-member process 600 starts by accepting a query (at 610) from an example non-member third party entity. The non-member process 600 then prices the query and delivers data (at 620) based on the query directives. In some embodiments, the non-member process 600 provides for extending a limited use license of the data (at 630). In some embodiments, the non-member process 600 includes delivering the data (based on license or not) (at 640), collects payment (at 650) for the delivered data, and distributes the payment to the members of the exchange (at 660). Then the non-member process 600 ends.

The self-governed data exchange system that prices data elements aggregated for exchange can be deployed in multiple different industries to create collectives of the common data typically desired. Thus, the self-governed data exchange system can be deployed in agriculture, banking and cyber-intelligence, and many other industries. Also, the self-governed data exchange system that prices data elements aggregated for exchange can be adapted for inputs into other data streams to enhance different situational areas, such as improving response times for first responders, managing highway traffic flows, reducing home energy usage during peak times, and developing predictive models surrounding economic activity, etc.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and/or "program" are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 7 conceptually illustrates an electronic system 700 with which some embodiments of the invention are implemented. The electronic system 700 may be a computer, phone, PDA, or any other sort of electronic device. Such an electronic system includes various types of computer readable media and interfaces for various other types of computer readable media. Electronic system 700 includes a bus 705, processing unit(s) 710, a system memory 715, a read-only 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 5-6 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A data exchange system comprising:
   a data warehouse;
   a data exchange computer that is programmed to act as a central hub and receive data from IoT sensors situated in different domains, normalize the data from the IoT sensors, and store the received and normalized data in the data warehouse;
   an API integrator that is programmed to supply data to and query data from the data warehouse of the data exchange computer and to pass data to parties;
   a calculator that is programmed to perform calculations in order to determine values based on several parameters; and
   a parameter table that holds variables for the calculator, and
   wherein the API integrator is further programmed to (i) allow the IoT sensors to provide the data to the data exchange system in a standardized format, (ii) allow users to query the data from the data exchange system, and (iii) allow the users to use the calculator when querying data from the IoT sensors; and
   a client computer programmed transmit a request for data associated with the normalized data associated with the IoT sensors to the data exchange computer via the API integrator, and receive the requested data from the data exchange computer via the API integrator.

2. The data exchange system of claim 1, wherein the data exchange computer is a self-governed data exchange computer.

3. The data exchange system of claim 1, wherein the data received from IoT sensors are data elements, and the calculator and the parameter table continuously update values associated with the data elements.

4. The data exchange system of claim 3, wherein the IoT sensors comprise water sensors, agricultural sensors, light sensors, temperature sensors, and camera sensors.

5. The data exchange system of claim 1, wherein the data received from IoT sensors are data elements, and the calculator and the parameter table continuously update values associated with the data elements, wherein the values are different for members and non-members of the data exchange system.

6. The data exchange system of claim 1, wherein the data warehouse stores raw data from the IoT sensors.

7. The data exchange system of claim 1, wherein the data exchange computer is programmed to aggregate and analyze data from the IoT sensors.

8. A method comprising:
 transmitting, by a client computer to a data exchange system, a request for data associated with normalized data associated with IoT sensors via an API integrator, and wherein the data exchange system comprises a calculator that performs calculations in order to determine values based on several parameters, and a parameter table that holds variables for the calculator, wherein the data exchange system is further programmed to cause a processor in the data exchange system to (a) receive data from the IoT sensors associated with different data domains via the API integrator, the API integrator programmed to (i) allow users operating the IoT sensors to provide the data to the data exchange system in a standardized format, (ii) allow the users to query the data from the IoT sensors from the data exchange system, and (iii) allow the users to use the calculator when querying data from the IoT sensors, (b) normalize the data associated with the different data domains to provide consistency for the data from the different data domains, and (c) store in a data warehouse, the normalized data; and
 receiving, by the client computer, the requested data associated with the normalized data from the data exchange system via the API integrator.

9. The method of claim 8, wherein the client computer is a non-member computer.

10. The method of claim 8, wherein requested data received by the client computer is determined using historical data.

11. The method of claim 8, wherein requested data received by the client computer is determined using a quantity of the data stored in the data warehouse.

12. The method of claim 8, wherein the request for data comprises a request for aggregated data from the data warehouse.

13. The method of claim 8, wherein the IoT sensors are operated by members of an organization that operates the data exchange system.

14. The method of claim 8, wherein the data received from the IoT sensors are data elements, and the calculator and the parameter table continuously update values associated with the data elements.

15. The method of claim 8, wherein the IoT sensors comprise water sensors, agricultural sensors, and traffic camera sensors.

16. The method of claim 8, wherein the data is normalized to allow for efficient querying of the normalized data.

17. The method of claim 8, wherein the data warehouse stores data associated with the different domains in different tables within a single monolithic database.

18. The method of claim 8, wherein the IoT sensors measure different types of environmental data.

19. The method of claim 8, wherein the parameter table is generated based on query counts, CPU usage, and API calls.

20. The method of claim 8, wherein the parameter table is a pricing table.

* * * * *